US008246754B2

(12) United States Patent
Nauka et al.

(10) Patent No.: US 8,246,754 B2
(45) Date of Patent: Aug. 21, 2012

(54) PROCESS FOR REMOVING INK FROM PRINTED SUBSTRATE

(75) Inventors: Krzysztof Nauka, Palo Alto, CA (US); Sivapackia Ganapathiappan, Palo Alto, CA (US); Manoj K. Bhattacharyya, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 356 days.

(21) Appl. No.: 12/567,365

(22) Filed: Sep. 25, 2009

(65) Prior Publication Data

US 2011/0073134 A1 Mar. 31, 2011

(51) Int. Cl.
*B08B 7/04* (2006.01)
*C09D 11/00* (2006.01)

(52) U.S. Cl. ........ 134/10; 134/42; 106/31.32; 106/31.64

(58) Field of Classification Search .................. None
See application file for complete search history.

(56) References Cited

U.S. PATENT DOCUMENTS

| | | | | |
|---|---|---|---|---|
| 5,545,381 | A | * | 8/1996 | Iida et al. .................. 422/186 |
| 5,574,538 | A | | 11/1996 | Takahashi et al. |
| 6,066,439 | A | * | 5/2000 | Nohr et al. .................. 430/347 |
| 2001/0008164 | A1 | | 7/2001 | Sano et al. |
| 2004/0116596 | A1 | * | 6/2004 | Vincent et al. .............. 524/775 |
| 2004/0150702 | A1 | | 8/2004 | Tsuyoshi et al. |
| 2004/0168599 | A1 | | 9/2004 | Riepenhoff et al. |
| 2004/0250398 | A1 | * | 12/2004 | Morii et al. .................. 29/403.1 |
| 2008/0026221 | A1 | * | 1/2008 | Vincent et al. .............. 428/407 |
| 2009/0295851 | A1 | * | 12/2009 | Edwards et al. .................. 347/9 |

FOREIGN PATENT DOCUMENTS

| | | |
|---|---|---|
| EP | 2 003 497 A1 | 12/2008 |
| JP | 4 022968 | 1/1992 |

* cited by examiner

*Primary Examiner* — Michael Kornakov
*Assistant Examiner* — Nicole Blan
(74) *Attorney, Agent, or Firm* — Sandra B. Beccarelli

(57) ABSTRACT

A process for removing ink from a printed media substrate. Such process includes the step of providing a media substrate including an ink printed image wherein the ink composition or the media substrate contains photolabile entities. Then the process includes the step of applying UV light on the printed substrate wherein the emitted UV light has a wavelength value which is below the threshold wavelength of the photolabile entities.

16 Claims, 4 Drawing Sheets

PROCESS FOR REMOVING INK FROM PRINTED SUBSTRATE

BACKGROUND

In recent years, the explosive growth in printers and copier installations, combined with growth in the usage, has created a huge demand for media substrate, such as paper sheet. In addition, in relation with such usage, many paper sheet documents are promptly discarded after being read. Therefore, although paper is inexpensive, the quantity of discarded paper documents is enormous, and the disposal of these documents raises significant cost and environmental issues. Nowadays, it has, thus, become a priority to reuse and recycle such used media.

Typically, used media such as printed matter, copied papers or facsimiled papers are rarely reused in offices. Indeed, though part of them are collected and processed to recycled papers, most of them are incinerated because of private matters recorded therein. Furthermore, recycling of paper sheets, once printed by a printer or by a copying machine, is expensive due to enormous economical and environmental costs of collecting and transporting the used paper to recycling points, further compounded by large amounts of bleaching agent, water and electrical power needed for recycling.

Therefore, the reuse of the same papers in offices is often desirable. In view of meeting such objective, one of the options is to have a process which enables the images and, more generally the ink composition, to disappear or to be easily removed from the printed media. Accordingly, there is a continuing desire for providing a process for removing ink from printed substrate.

BRIEF DESCRIPTION OF THE DRAWINGS

In order to better understand the invention, some embodiments will be described below by way of non-limiting examples only, with reference to Figures, wherein.

DETAILED DESCRIPTION

Figure 1:
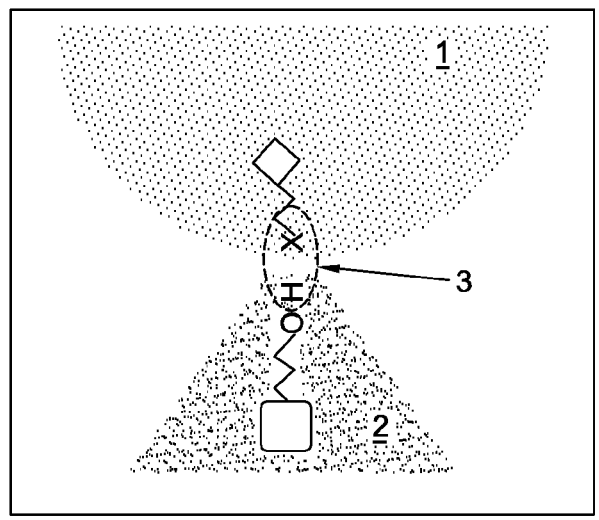
FIG. 1 is a schematic view illustrating the attractive interaction that occurs between ink and paper substrate according to one embodiment of the present invention.

Embodiments of the present disclosure will employ, unless otherwise indicated, techniques of printing technique, chemistry technique and the like, that are within the skill of the art. Such techniques are explained fully in the literature. The following examples are put forth to provide those of ordinary skill in the art with a complete disclosure and description of how to perform the methods disclosed and claimed herein. Efforts have been made to ensure accuracy with respect to numbers (e.g., amounts, temperature, etc.) but some errors and deviations should be accounted for.

Before the embodiments of the present disclosure are described in detail, it is to be understood that, unless otherwise indicated, the present disclosure is not limited to particular materials and processes disclosed herein, as such may vary to some degree. It is also to be understood that the terminology used herein is for purposes of describing particular embodiments only, and is not intended to be limiting, as the scope of the present invention will be defined only by the appended claims and equivalents thereof.

In the present specification, and in the appended claims, the following terminology will be used: the singular forms "a", "an", and "the" include plural referents unless the context clearly dictates otherwise. Thus, for example, reference to "a support" includes a plurality of supports. The terms "about" and "approximately," when referring to a numerical value or range is intended to encompass the values resulting from experimental error that can occur when taking measurements. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to approximately 20 wt % should be interpreted to include not only the explicitly recited concentration limits of 1 wt % to approximately 20 wt %, but also to include individual concentrations such as 2 wt %, 3 wt %, 4 wt %, and sub-ranges such as 5 wt % to 15 wt %, 10 wt % to 20 wt %, etc.

As used herein, "images" refers to marks, signs, symbols, figures, indications, and/or appearances deposited upon a substrate with a visible ink composition. Examples of an image can include characters, words, numbers, alpha-numeric symbols, punctuation, text, lines, underlines, highlights, and the like. As used herein, the terms "ink" or "ink composition" refer to any compositions or compounds containing colorant, such as pigment, that are able to be applied onto a substrate in view of creating a printed image thereon.

In an embodiment, the present disclosure is drawn to a process for removing ink from a printed substrate. The process includes the steps of providing a media substrate including an ink printed image wherein the ink composition or the media substrate contains photolabile entities, and applying UV light on the printed substrate wherein the emitted UV light has a wavelength value which is below the threshold wavelength of the photolabile entities.

In another embodiment, the process includes the further step of removing the ink residue, from the resulting blank substrate, with a mechanical method.

The present disclosure refers also to the ink composition and to the substrate media including such photolabile entities.

In embodiments of the present disclosure, the process has the benefit of reducing the amount of discarded paper/media substrates. Indeed, after the removal of ink and of the printing information from the substrate, the resulting blank paper/media substrate can be reused in a printing process. Thus, the same paper/media substrate or sheet may be effectively reused many times. In addition, the process presents the benefit of reducing the global cost of printing. Indeed, removed ink particles (or dust) and polymer ink additives, present on the printing substrate, once removed, can be recovered from the ink solid residues. Such residues can thereafter be reused in ink formulations, thus providing lower ink costs and additional environmental benefits.

According to embodiments of the present disclosure, photolabile entity, or photolabile compound, refers herein to compound(s) or molecule(s) including at least a chemical group having the capability of breaking or disintegrating when illuminated with UV light. Such UV light has a wavelength below the threshold value (or threshold wavelength) of the photolabile entity. Indeed, each photolabile entity has a specific threshold value below which the entity is disintegrated.

In an embodiment of the present disclosure, non-limiting examples of photolabile groups include compounds including groups selected from ortho-nitrobenzyl groups, phenacyl groups, benzoic ester groups, ortho-nitrophenyl glycol groups, dithiane groups, sulphonamides groups, benzyl alcohol groups, polycyclic aromatic hydrocarbon groups, and combinations thereof.

In another embodiment, the photolabile entities are compounds including phenacyl groups or benzoic ester groups. In yet another embodiment, the photolabile entities are α-methylphenacyl, 3-methoxyphenacyl, 3-hydroxyphenacyl, 3-aminophenacyl or 3,5-dimethoxybenzoid.

In an embodiment, the photolabile groups are incorporated into a polymeric chain. In an embodiment, such polymeric chains are polyethylene polymers or a polymeric resins such, as for example, poly(methyl methacrylate). Examples of polymeric chains including photolabile groups, include, but are not limited to:

Polymer containing ortho-nitrobenzyl photolabile group,

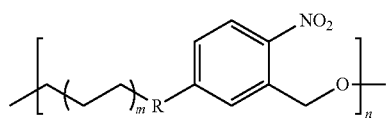

Polymer containing phenacyl photolabile group,

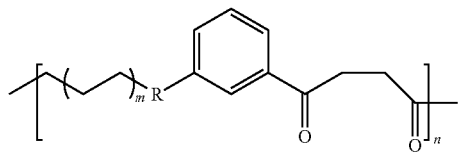

Polymer containing benzoic ester photolabile group,

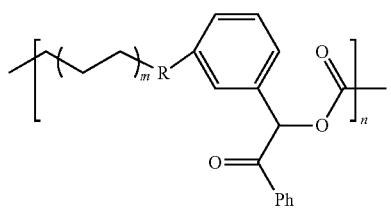

Polymer containing ortho-nitrophenyl glycol photolabile group,

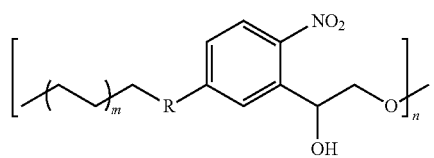

Polymer containing dithiane photolabile group,

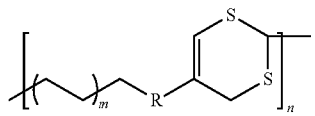

Polymer containing sulphonamide photolabile group,

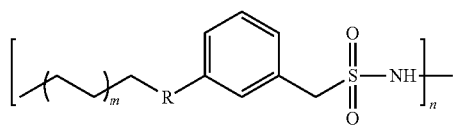

Polymer containing benzyl alcohol photolabile group,

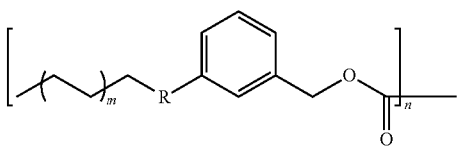

Polymer containing polycyclic aromatic hydrocarbon photolabile group.

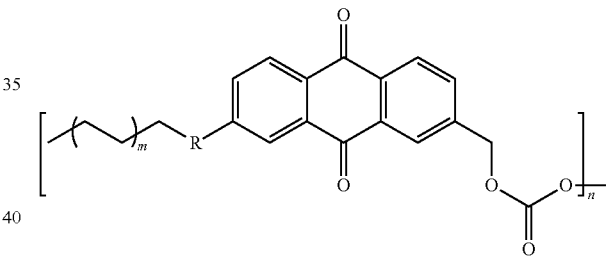

In embodiments of the present disclosure, in formulae above, R represents a linker. In an embodiment, R is selected form the group consisting of O, $CH_2$, $SO_2$, CO, COO. In other words, the linker group R is an oxy, a methylene, a sulfonyl, a carbonyl or a carboxyl group. In an embodiment, m is from 1 to 50,000; and in another embodiment, m is from 5 to 1,000. In an embodiment, n is from 1 to 50,000; and in another embodiment, n is from 5 to 1,000.

Table A below illustrates compounds containing photolabile groups. Examples of such compounds are selected from ortho-nitrobenzyl groups, phenacyl groups, benzoic esters groups, ortho-nitrophenyl glycols groups, dithiane groups and the like, sulphonamides groups, benzyl alcohols groups, polycyclic aromatic hydrocarbons groups, and combinations thereof.

Table A below also illustrates chemical formulae and the corresponding threshold wavelength, i.e., the wavelength below which disintegration of the photolabile group occurs. Such compounds are commercially available from Sigma Aldrich or from companies such as Applied Biosystems Inc., AMBI Pharmaceuticals, Inc. or NEO BioScience Companies.

TABLE A

| Name | Formula | threshold wavelength |
|---|---|---|
| *ortho-nitrobenzyl group compounds:* | | |
| NVOC (6-nitroveratroyloxy carbonyl) | 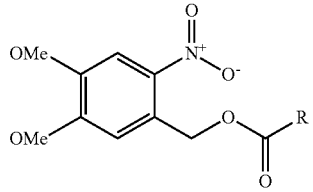 | >350 nm |
| NBOC (nitrobenzyloxy carbonyl) | 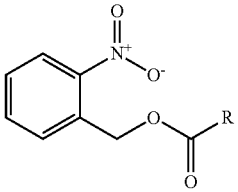 | >330 nm |
| DNBOC (di(nitrobenzyl) oxycarbonyl)) | 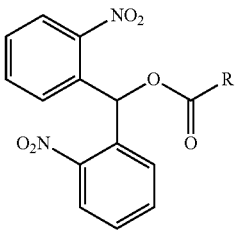 | >330 nm |
| NPPOC (3-nitrophenylpropyl-oxycarbonyl) | 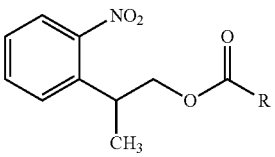 | 365 nm |
| MeNPOC (5'-(α-methyl-2-nitropiperonyl) oxycarbonyl) | 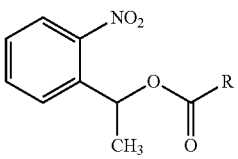 | 365 nm |
| MNPPOC (2-(3,4-methylenedioxy-6-nitrophenyl)propoxycarbonyl) | 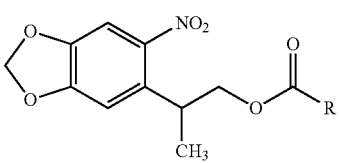 | 365 nm |
| *phenacyl group compounds:* | | |
| α methylphenacyl | 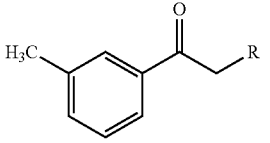 | >315 nm |
| 3-methoxyphenacyl | 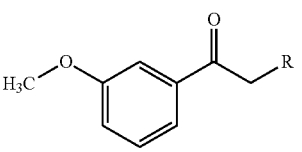 | >315 nm |

TABLE A-continued

| Name | Formula | threshold wavelength |
|---|---|---|
| 3-hydroxyphenacyl | HO-C6H4-C(O)-CH2-R (3-hydroxy) | 300 nm |
| 3-aminophenacyl | H2N-C6H4-C(O)-CH2-R (3-amino) | 300 nm |
| *benzoic ester group compounds:* | | |
| 3,5-dimethoxy benzoid | 3,5-(MeO)2-C6H3-CH(OC(O)R)-C(O)-Ph | 366 nm |
| *ortho-nitrophenyl glycol group compounds:* | | |
| o-nitrophenylethylene glycol | 2-(o-NO2-C6H4)-1,3-dioxolane with 2,2-R1,R2 | 350 nm |
| Bis (o-nitrophenyl)ethanediol | 4,5-bis(o-NO2-C6H4)-2,2-R1,R2-1,3-dioxolane | 350 nm |
| *dithiane group compounds:* | | |
| 1,3-Dithiane | 2-[C(R1)(R2)(OH)]-1,3-dithiane | 350 nm |
| 2-Phenyl-1,3-Dithiane | 2-[C(Ph)(R1)(OH)]-1,3-dithiane | 350 nm |

TABLE A-continued

| Name | Formula | threshold wavelength |
|---|---|---|
| benzyl alcohol group compounds: | | |
| Benzyloxycarbonyl | | 260 nm |
| M-Dimethoxy benzyl Alcohol | | 350 nm |
| Ddz (α,α-dimethyl-3,5-dimethoxybenzyloxycarbonyl) | | 282 nm |
| Pixyl (9-phenylxanthen-9-yl) | | 254 nm |
| sulphonamide group compounds: | | |
| Tosyl (desoxybenzoinyl) | | >300 nm |
| 2-aryl-4-quinoline | | 350 nm |
| polycyclic aromatic hydrocarbon group compounds: | | |
| Aqmoc (anthraquiono-2-yl-methoxy-carbonyl) | | 350 nm |

TABLE A-continued

| Name | Formula | threshold wavelength |
|---|---|---|
| Pmoc (pyren-1-ylmethoxycarbonyl) | 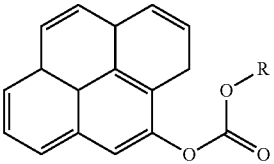 | 350 nm |
| Phmoc (phenathren-9-yl-methoxy-carbonyl) | 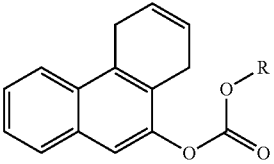 | 350 nm |

In an embodiment, in the above formula, the R, $R^1$ and $R^2$ groups are, independently, H, an alkyl group or a substituted alkyl group. In another embodiment, R, $R^1$ and $R^2$ are, independently, H, a lower alkyl group or a lower substituted alkyl group. In another embodiment, R, $R^1$ and $R^2$ are, independently, H or an alkyl group. In yet another embodiment, R, $R^1$ and $R^2$ are H.

As used herein, the term "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, and thioaryl.

The term "alkyl" as used herein means a branched, unbranched, or cyclic saturated hydrocarbon group, which typically, although not necessarily, contains from 1 to about 50 carbon atoms, or 1 to about 30 carbon atoms, or 1 to about 20 carbon atoms for example. Alkyls include, but are not limited to, methyl, ethyl, n-propyl, isopropyl, n-butyl, isobutyl, t-butyl, octyl, and decyl, for example, as well as cycloalkyl groups such as cyclopentyl, and cyclohexyl, for example. The term "lower alkyl" means an alkyl group having from 1 to 6 carbon atoms. The term "higher alkyl" means an alkyl group having more than 6 carbon atoms, for example, 7 to about 50 carbon atoms, or 7 to about 40 carbon atoms, or 7 to about 30 carbon atoms or more. As used herein, the term "substituted alkyl" means an alkyl substituted with one or more substituent groups. The term "heteroalkyl" means an alkyl in which at least one carbon atom is replaced with a heteroatom. If not otherwise indicated, the term "alkyl" includes unsubstituted alkyl, substituted alkyl, lower alkyl and heteroalkyl.

In an embodiment of the present disclosure, photolabile entities are linked to any ink components of the ink composition. In another embodiment, the photolabile entities are linked to the colorant present in the ink composition. As used herein, "colorant" includes dyes, pigments, and/or other particulates that may be suspended or dissolved in an ink vehicle. In an embodiment, according to the present invention, the inks include pigments as colorants. Thus, in another embodiment, the photolabile entities are linked to the pigments present in the ink composition.

Pigments that can be used herein include self-dispersed pigments and non self-dispersed pigments. Self-dispersed pigments include those that have been chemically surface modified with a charge, a small molecule attachment or a polymeric grouping. In another embodiment, pigment is a non self-dispersed pigment that utilizes a separate and unattached dispersing agent (which can be a polymer, an oligomer, or a surfactant, for example) in the liquid vehicle or physically coated on the surface of the pigment. In an embodiment, colorants are polymer-dispersed pigments; in another embodiment, colorants are an acrylic resin-dispersed pigment. In an embodiment, pigments can include color-imparting particulates and other substances that may be suspended or solvated in a liquid vehicle. In an embodiment, suitable pigments are black pigments, white pigments, cyan pigments, magenta pigments, yellow pigments or the like. Pigments, according to an embodiment of the present invention, are organic or inorganic particles.

In an embodiment, pigments are selected from the group consisting of: azo pigments, polycyclic pigments, anthraquinone pigments, dioxazine pigments, triarylcarbonium pigments and quiphthalone pigments. Examples of azo pigments include, but are not limited to, monoazo yellow and orange disazo pigments, napththol pigments, benzimidazalone pigments, disazo condensation pigments, isoindoline and isoindolinone pigments, metal complex pigments. Examples of polycyclic pigments include, but are not limited to, phthalocyanine pigments, quinacridone pigments, perylene and peridone pigments, diketopyrrolo-pyrrole (dpp) pigments and thioindigo pigments. Examples of anthraquinone pigments include, but are not limited to, anthrapyrimidine pigments, flavanthrone pigments, pyrathrone pigments and anthranthrone pigments.

In an embodiment, examples of black pigments include carbon pigments. Carbon pigments suitable for use, in embodiments of the present invention, include, without limitation, carbon black, graphite, vitreous carbon, charcoal pigments and any combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. duPont de Nemours and Company. Suitable carbon black pigments include, without limitation, Cabot pigments such as Monarch®1400, Monarch®1100, Cabojet®200, Black Pearls®, and Vulcan® pigments; Columbian pigments such as Raven®7000 and Raven®3500; Degussa pigments such as Color Black FW® 200, Special Black 6, Special Black 5, Special Black 4, and Printex®140V; and Tipure R® available from Dupont, and the like.

Exemplary pigments that are suitable for use in accordance with embodiments of the present invention also include azo pigments such as azo lake pigments, insoluble azo pigments, and condensed azo pigments; as well as polycyclic pigments such as phthalocyanine pigments; quinacridone pigments, dioxazine pigments, and anthraquinone pigments. Specific pigments that are suitable for use include Pigment Blue 15:3, Pigment Green 36, Pigment Blue 15:6, Pigment Red 177, and/or Pigment Red 208 (from DIC); Pigment Red 168, Pigment Violet 23, Pigment Yellow 155, and/or Pigment Violet 19 (from Clariant); and Pigment Red 254 (from Ciba).

In an embodiment, the pigment refers to a polymer-encapsulated pigment which includes a pigment core and a polymer shell wherein the polymer shell includes photolabile entities. In another embodiment, photolabile entities are linked to and/or part of the polymer shell encapsulating the pigments present in the ink composition.

By "polymer shell", it is meant herein a layer of polymer or of latex material that is deposited on, or attached to, the surface of a pigment particle, or alternatively, is attached to an intermediate bridging layer which is deposited on the surface of the pigment. This polymer shell can be attached or deposited on the pigment particle or on a bridging layer deposited on the pigment particle. The thickness of the polymer shell can be of any suitable thickness. However, in an embodiment, the polymer shell has an average thickness ranging from about 2 nm to about 100 nm. Suitable polymers can have any weight average molecular weight that is functional, but in one embodiment, the average molecular weight is from 5,000 Mw to 2,000,000 Mw. In another embodiment, the average molecular weight is from 25,000 Mw to 500,000 Mw.

In an embodiment of the present disclosure, such as illustrated in FIG. 1, the pigment or the polymeric shell of the pigment (1) encompasses substituents X, wherein the substituents X are, as an example, organic acid groups. In another embodiment, the substituents X are provided by polymeric ink additives or provided by pigment surface groups. Examples of binding groups X that may reside on the pigment surface or that might be present in the pigment polymeric additives include: sulfone, sulfonate, sulfide, thiol, disulfide, phosphate, phosphono, pyridyl, nitro, nitroxy, nitrile, cyanate, azo, azide, aldimine, amine, amide, carboxyl, ester, alkyl, alkenyl, phenyl, benzyl, bromo, iodo, hydroxyl, carbonate or carboxylate groups. In another embodiment, the substituent X, present at the surface of the pigment, is a sulfonate group. Without being linked by any theory, it is believed that the substituent X, present on the surface of the pigment (1), helps the pigment (1) to interact with the substrate (2).

Thus, in another embodiment, the present disclosure refers to an ink composition containing photolabile entities such as described herein. In another, the present disclosure refers to an ink composition including pigments containing photolabile entities such as described herein. In yet another embodiment, the present disclosure refers to an ink composition containing polymer-encapsulated pigments including a pigment core and a polymer shell wherein the polymer shell includes photolabile entities.

In another embodiment of the process of the present disclosure, the photolabile entities are linked to the media substrate. In an embodiment of the present invention, the substrate can be of any type and size. In another embodiment, the substrate includes any substrate that is suitable for use in digital color imaging devices, such as electrophotographic and/or inkjet imaging devices, including, but in no way limited to, resin coated papers (so-called photo-based papers), papers, overhead projector plastics, coated papers, fabrics, art papers (e.g., watercolor paper), plastic film of any kind, and the like. The substrate includes porous and non-porous surfaces.

In another embodiment, the substrate is paper (non-limitative examples of which include plain copy paper or papers having recycled fibers therein) or photo-paper (non-limitative examples of which include polyethylene or polypropylene extruded on one or both sides of paper), and/or combinations thereof. In an embodiment, the substrate is paper. In an embodiment, the substrate has a thickness along substantially the entire length ranging between about 0.025 mm and about 0.5 mm. In yet another embodiment, the media substrate is a paper substrate.

In embodiments of the present invention, a coating composition is used for the coating of the substrate. The coating composition will form an image-receiving layer (or coating layer) on the substrate that will provide ink adhesion.

In an embodiment, photolabile entities are present in the coating layer of the media substrate. In an embodiment, the photolabile entities are part of the polymers that are present in the coating layer of the media substrate. The combination of substrate and coating composition containing photolabile compounds results in a media substrate, or paper substrates, including photolabile compounds. In order to minimize the cost, the coating could be limited only to the regions where ink subsequently will be deposited, or the entire page could be coated. Thus, in an embodiment, the photolabile compound is present in the entire surface of the paper or of media sheet. In another embodiment, the photolabile compound is present only on a part of the media sheet or paper.

In an embodiment, the coating composition, present on the media sheet, has a coat weight which is in the range of about 2 to about 30 grams per square meter ($g/m^2$); in another embodiment, the coating composition has a coat weight which is in the range of about 3 to about 20 grams per square meter ($g/m^2$). In an embodiment, coating compositions are applied to one side or to both opposing sides of the supporting substrate.

Coating compositions, adapted for printing papers, often include a pigment and a binder. The function of the binder is, mainly, by forming a continuous film, to bond the pigment particles together, as well as to bind the pigment particles to the base substrate. Examples of such binders are synthetic polymer emulsions such as styrene butadiene latexes (SBR), carboxylated SBR, styrene acrylate latexes (acrylate latex) and polyvinyl acetate latexes (PVAc). In an embodiment of the present invention, the photolabile compound is covalently linked with the binder of the coating composition.

In an embodiment of the present disclosure, the paper substrate or the coating layer of the paper substrate encompasses substituent Y which acts as a binding group. Examples of binding group Y that may reside within the paper surface layer include, but are not limited to, hydroxyl, alkyl, phenyl, aldehyde, carboxamine, amine (primary, secondary, tertiary), ketimine, aldimine, imide or amide groups. In another embodiment, the substituent Y, present at the surface of the substrate, is a hydroxyl group (OH). In an embodiment, such as illustrated in FIG. 1, the substituent Y, present on the surface of the substrate (2) interacts with the ink composition (1).

Thus, in an embodiment, photolabile entities are linked to a substrate, such as a paper substrate. In another embodiment, photolabile entities are linked to the coating composition present on the paper substrate. Thus, in an embodiment, the present disclosure provides a media substrate, including a paper substrate and a layer coated on, or impregnated into the paper substrate, wherein the coated layer includes a photolabile group. In another embodiment, the present disclosure provides a method of making a media substrate, including applying a coating layer composition to a paper substrate, wherein the coating layer composition includes a photolabile group.

As described herein, in an embodiment, the present disclosure provides a process for removing an image from media substrates. Such process encompasses as a first step, the step of providing a media substrate. The media substrate, in an embodiment paper substrate, includes an ink printed image wherein the ink composition or the substrate contains photolabile entities. Then the process encompasses the step of exposing the ink printed image to UV irradiation. The UV light has a wavelength which is below the threshold value of the photolabile entity and results therefore in the removal of the visible image and on a blank media substrate.

In another embodiment, the process includes the further step of removing the ink residue from the resulting blank substrate using a mechanical method.

In embodiments, either the ink, present in the printed image, or the media substrate containing the printed image, includes photolabile materials that exhibit a rupture in response to UV light. The photolabile material exhibits photolability, which is an irreversible transformation of a chemical species induced by absorption of electromagnetic radiation, resulting in the rupture of chemical bonds. Thus, when the photolabile material is exposed to ultraviolet (UV) light, the photolabile material is broken up. This break up cannot be reversed, and results in a rupture of the bonds that were linking the ink to the media. The image is, therefore, "erased," and the paper returns to a blank state.

Without being linked by any theory, the adhesion of ink composition to substrate, or paper, is based on attractive interactions between the chemical groups residing within, as an example, the paper surface layer and within the outer region of the ink particle. Non-limiting examples of groups providing these interactions include, on the ink side, organic acid groups provided by the polymeric ink additives or pigment surface groups, and, on the paper side, hydroxyl and amino groups within the paper surface coating.

An example of such interactions is illustrated in FIG. 1. In FIG. 1, the ink (1) interacts with the paper (2) via attractive interactions (3). The molecules that are able to interact with each other, encompass, for the ink, compounds having the substituents X, wherein the substituents X are, as examples, organic acid groups provided by polymeric ink additives, by pigment surface groups or by polymer present in the polymer shell encapsulating the pigment. The molecules that are able to interact with each other encompass, for the substrates, compounds having hydroxyl group. As illustrated in FIG. 1, such attractive interactions, that might occur between hydroxyl groups present on the paper and organic acid groups present in the ink, provide ink adhesion to paper, and result in printing with a desired pattern. The aforementioned attractive interactions ensure therefore that ink adheres to the paper surface. The attractive interactions disclosed herein can be of any nature. Such interactions can be the result of covalent bonds, of hydrogen bonds, or can be the result of electrostatic interactions.

Figure 2:
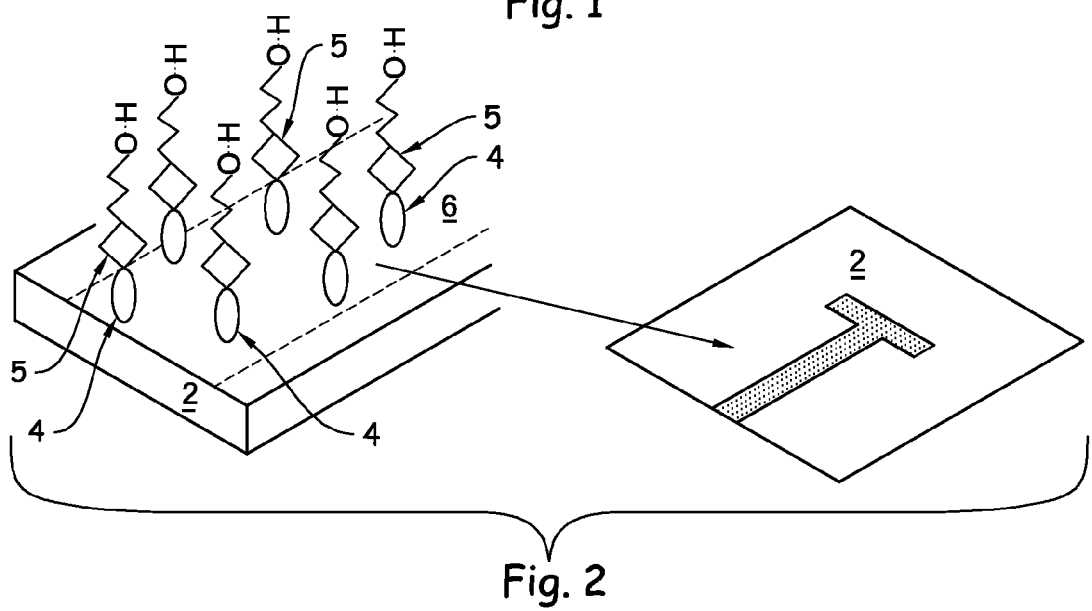
FIG. 2 is a schematic view illustrating photolabile groups that are bonded to paper substrate according to one embodiment of the present invention.

In an embodiment of the present disclosure, such as illustrated in FIG. 2, the substrates, such as paper (2), encompass linkers (4) that provide covalent bonds between the paper and photolabile groups (5). Such photolabile group is bonded to a chemical group that will react/interact with the ink, such as hydroxyl group, as an example. In an embodiment of the present disclosure, such as illustrated in FIG. 2, the paper surface (2) is coated with a thin layer coating (6). Such coating (6) contains photolabile groups and provides the ink adhesion. In another embodiment, such as illustrated in FIG. 2, the coating could be limited only to regions where subsequently ink will be deposited. Thus, in an embodiment, the paper surface is selectively coated with the layer containing photolabile entities and the ink-attractive groups. In another embodiment, the coating could be applied to the entire page where subsequently ink will be deposited.

Figure 3:
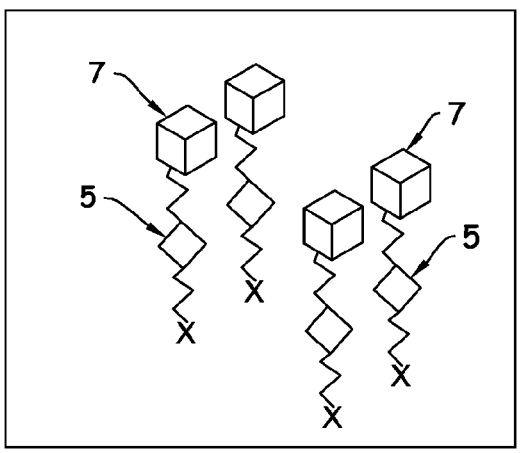
FIG. 3 is a schematic view illustrating photolabile groups that are bonded to pigment particles according to one embodiment of the present invention.

In an alternative embodiment of the present disclosure, such as illustrated in FIG. 3, the photolabile entity (5) is bonded to the pigment particles (7). Such photolabile group (5) may also be provided with a linker group (X) that facilitates the bonding to the substrate. In an embodiment, the photolabile entity (5) is bonded to pigment particle (7) via a connecting group such as ester, ether or ketone groups.

In an embodiment, the present disclosure provides therefore a process for removing an image from media substrates, including the steps of providing a media substrate including an ink printed image, wherein the ink composition or the substrate contains photolabile entities, and exposing the ink printed image to UV irradiation in an image wise manner in view of erasing the visible image. Thus, in the process, when the printed page is not needed any more, such printed image is illuminated with a wavelength below the threshold value of the photolabile group. This illumination results in the photolabile groups being disintegrated, and the bonds between the ink particles and paper are broken.

Thus as an example, when a photolabile group including α-methylphenacyl, 3-methoxyphenacyl, 3-hydroxyphenacyl, 3-aminophenacyl or 3,5-dimethoxybenzoid compounds are present in the ink printed image, a UV light having a wavelength below 300 nm will be used in view of removing the ink from the substrate.

Figure 4:
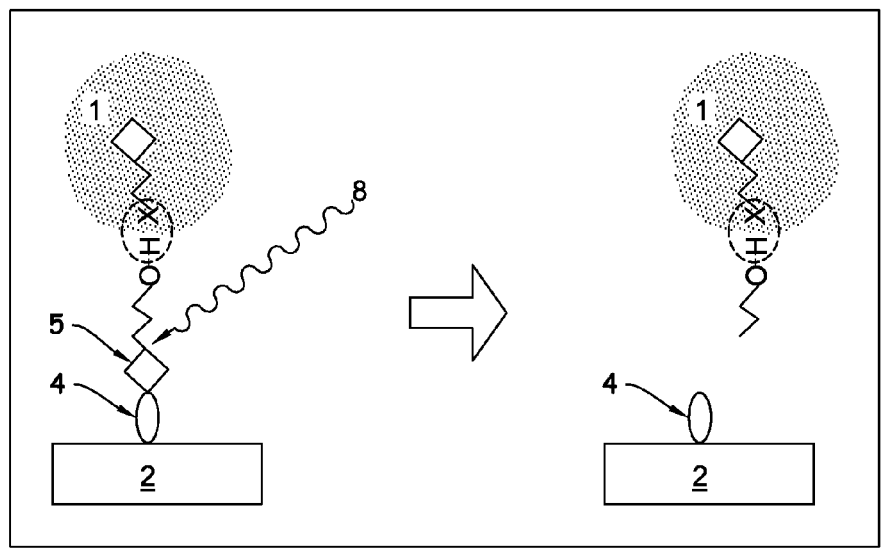
FIG. 4 is a schematic view illustrating the mechanism of ink removal using UV light according to one embodiment of the present invention.

In an embodiment of the present disclosure, such as illustrated in FIG. 4, once the image is formed via a compound containing the photolabile group, such image is removed via UV light (8). In an embodiment, UV light (8) is applied to the complex substrate (2)-ink (1). Such as illustrated herein, the complex ink-substrate interacts within each other via substituent X for the ink (1) and via hydroxyl group linked with photolabile group (5) and linker (4), for the substrate (2). In an embodiment, when UV light is applied to such complex, the photolabile group is broken. Such break results thus in the removal of the ink (1) from the substrate (2). Indeed, with the disintegration of the photolabile group, the ink (1) will be evacuated. Such disintegration of the photolabile group will result, therefore, in paper or substrate that does not contain any ink and that can easily be reused. The linker (4) will then fall off the surface leaving behind a pristine substrate or paper.

For erasing an image in order to reuse the substrate, in various exemplary embodiments, the substrate can be exposed to a suitable UV light. Such erasure can be conducted in any suitable manner, such as by exposing the entire substrate to the UV light at once or by exposing the entire substrate to the UV light in a successive manner.

The light used to remove the image from the substrate may have any suitable predetermined wavelength scope such as, for example, a single wavelength or a band of wavelengths. In an embodiment, the wavelength is adapted to the photolabile group and is able to break the group. In any case, the emitted UV light has a wavelength value which is below the threshold wavelength of the photolabile entity that is present either on the ink con either on the substrate.

In an embodiment, the UV light supplies sufficient energy to the photolabile material to cause the photolabile entity to be disintegrated or disrupted. The amount of energy irradiated on the particular location helps the photolabile group to be disrupted and the ink to be removed from the substrate. In various exemplary embodiments, the imaging light is an ultraviolet (UV) light having a single wavelength or a narrow band of wavelengths. For example, the UV light has a UV light wavelength below about 360 nm; in another embodiment, below 300 nm; and, in yet another embodiment, below 250 nm.

In an embodiment, for removing the image, the substrate containing the image may be exposed to the respective light for a time period ranging from about 10 milliseconds to about 5 minutes, particularly from about 30 milliseconds to about 1 minute. The light may have an intensity ranging from about 0.1 mW/cm$^2$ to about 100 mW/cm$^2$, and in another embodiment, ranging from about 0.5 mW/cm$^2$ to about 10 mW/cm$^2$.

In various exemplary embodiments, the UV light source may be generated for example by a computer or a Light Emitting Diode (LED) array screen, and the image to be removed from the substrate is placed in proximity to the LED screen for the desired period of time. In another exemplary embodiment, a UV Raster Output Scanner (ROS) may be used to generate the UV light. In another exemplary embodiment, the UV light may be obtained from a Xenon light source with a bulb having a power from 5 W to about 1000 W or, in another embodiment, from about 20 W to about 200 W, which is placed in the proximity of the areas of the document which is to be erased.

Figure 5:
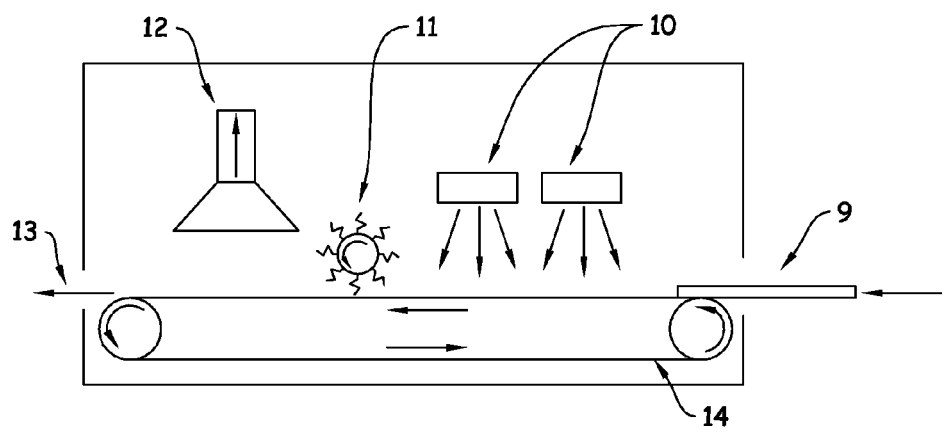
FIG. 5 is a schematic view illustrating an ink removing apparatus according to one embodiment of the present invention.

As illustrated in FIG. 5, in an embodiment of the present disclosure, the process includes the steps of, firstly, submitting a printed substrate (9) containing ink, such as printed paper with ink, wherein the ink composition or the substrate contains a photolabile entity. Then, the process includes the step of submitting such substrate to a UV radiation using a UV source (10), such as an LED for example, in view of breaking the photolabile group in order to remove it from the substrate.

In an embodiment, the process may, if desired, include the further step of submitting the printed substrate to a mechanical device (11) in order to dislodge ink particles that are no longer bonded to the substrate. In such step, the ink will be removed from the substrate with a mechanical device (11). Examples of such mechanical devices include a brush or a sponge.

In another embodiment, as another further step, the process may, if desired, encompass the step of removing the ink residue or the dust with a vacuum (12) from the resulting blank substrate. In an embodiment, at this stage of the process, the ink composition may be recycled and might be reused for ink production. Thus, in an embodiment of the present disclosure, the process of the present invention encompasses the step of recycling the ink particles, or dust, that are removed from the substrate. In another embodiment, the process encompasses the step of recovering ink additives from the ink solid residue and reuses such residue in ink formulation(s).

In another embodiment, the substrate, free of any image and of any ink, is removed via an exit (13) and might be either directly reused in a printing process or, submitted another time to the same above mentioned process. Thus, in an embodiment, when the process is completed, the substrate paper is free of any ink and, in another embodiment, the substrate paper is reused in a printing process.

In an embodiment, the substrate may be submitted several times to the above mentioned process. Indeed, on a substrate, the ink layers might have a thickness such that the ink removal step needs to be repeated at least several times.

In an embodiment, in case of a substrate containing multiple and/or overlapping layers of different colors, UV lights emitting several threshold wavelengths are used. In an embodiment, the threshold wavelength of the photolabile entities are selected to fall within the UV wavelength range where absorption of all aforementioned pigments are low, ensuring thus that the UV will penetrate through all different color layers and remove all pigments.

In another embodiment, the present disclosure relates to a removing device including:
- a substrate entrance (9), wherein the media substrate enters the device;
- a UV source (10);
- a mechanical removal device (11) (if desired) that dislodges ink particles from the substrate, such as a brush or a sponge;
- a dust vacuum (12) to remove ink residue or dust;
- an exit (13) wherein the substrate, free of any image and of any ink, is removed;
- a conveyor belt (14), which helps the substrate move from a step to another.

In an embodiment, this removal device is particularly applicable, for example, to a printer device. In an embodiment, the printer device can correspond to an inkjet printer or to a laser printer. In an embodiment of the present disclosure, the process of removing images according to the present disclosure can be coupled with a process of forming images. In an embodiment, the printing process for forming images is taking place either before or after the removing process. In an embodiment, such printing process uses an ink composition including photolabile entities. In another embodiment, such printing process uses substrates containing photolabile entities.

In another embodiment of the present disclosure, the UV source, which generates the desired wavelength emission, is enclosed into a portable unit. Such portable unit is not part of a global apparatus and is readily available to the owner of the printed page. Thus, in another embodiment, the process encompasses the use of a low power UV source with the desired wavelength emission that could be enclosed into a portable unit readily available to the owner of the printed page.

The following examples illustrate the embodiments of the invention that are presently best known. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what is presently deemed to be the most practical and preferred embodiments of the invention.

Example 1

Figure 6:
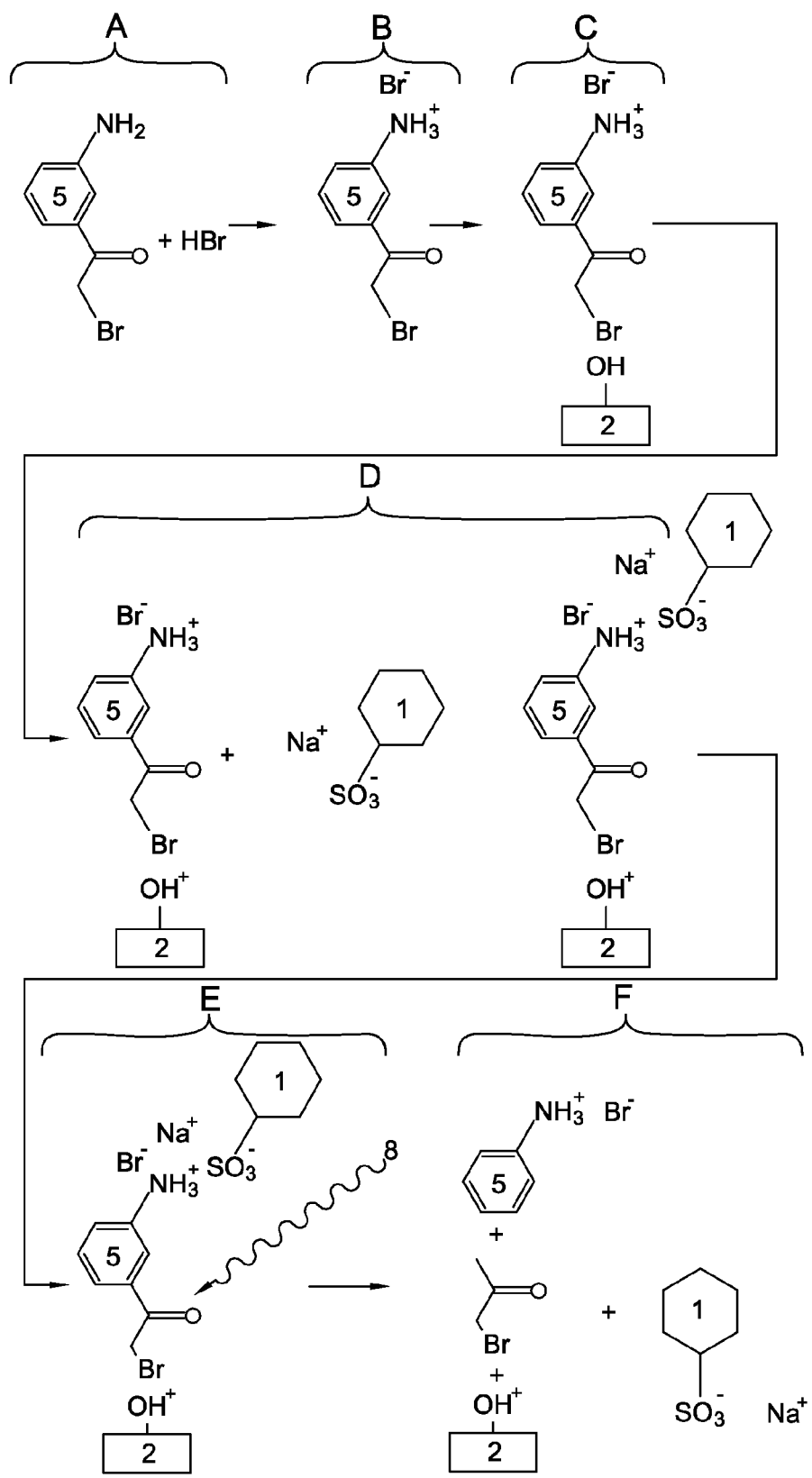
FIGS. 6 and 7 are schematic views illustrating exemplary embodiments of the process according to the present invention.

As illustrated in FIG. 6, in step A, 5 grams of a photolabile compound (5) (bromethyl 3-aminophenyl ketone) is treated with 4.05 grams of a 48% solution of hydrobromic acid in water (20 ml). An aqueous composition containing ammonium salt is obtained in step B. Such ammonium salt solution is then sprayed on a paper substrate (2) in step C. The bromo group present in the photolabile compound adheres to the paper substrate (2) via the attractive force between OH groups present on the surface of the medium and the Br atoms present on the photolabile compound (5). In step D, ink composition containing Cabojet®200 black pigments (1) (from Cabot Corporation), having sulfonate groups on the surface of pigment particles, is printed onto the paper substrate (2) in view of creating an image, using inkjet printing process via an inkjet printer. The pigment particles (1) are held firmly to the paper substrate (2) due to ionic interactions between sulfonate groups of the pigment and the ammonium groups present on the photolabile compound (5). In step E, the printed imaged is exposed to UV light (8), with a wavelength of in the range of 300 nm. As illustrated in step F, the photolabile compound (5) is then degraded. Such degradation results therefore in pigment particles (1) which are not bonded to the paper substrate (2). The pigment particle (1) is freed and can be easily removed. This sequence can be repeated multiple times.

Example 2

Figure 7:
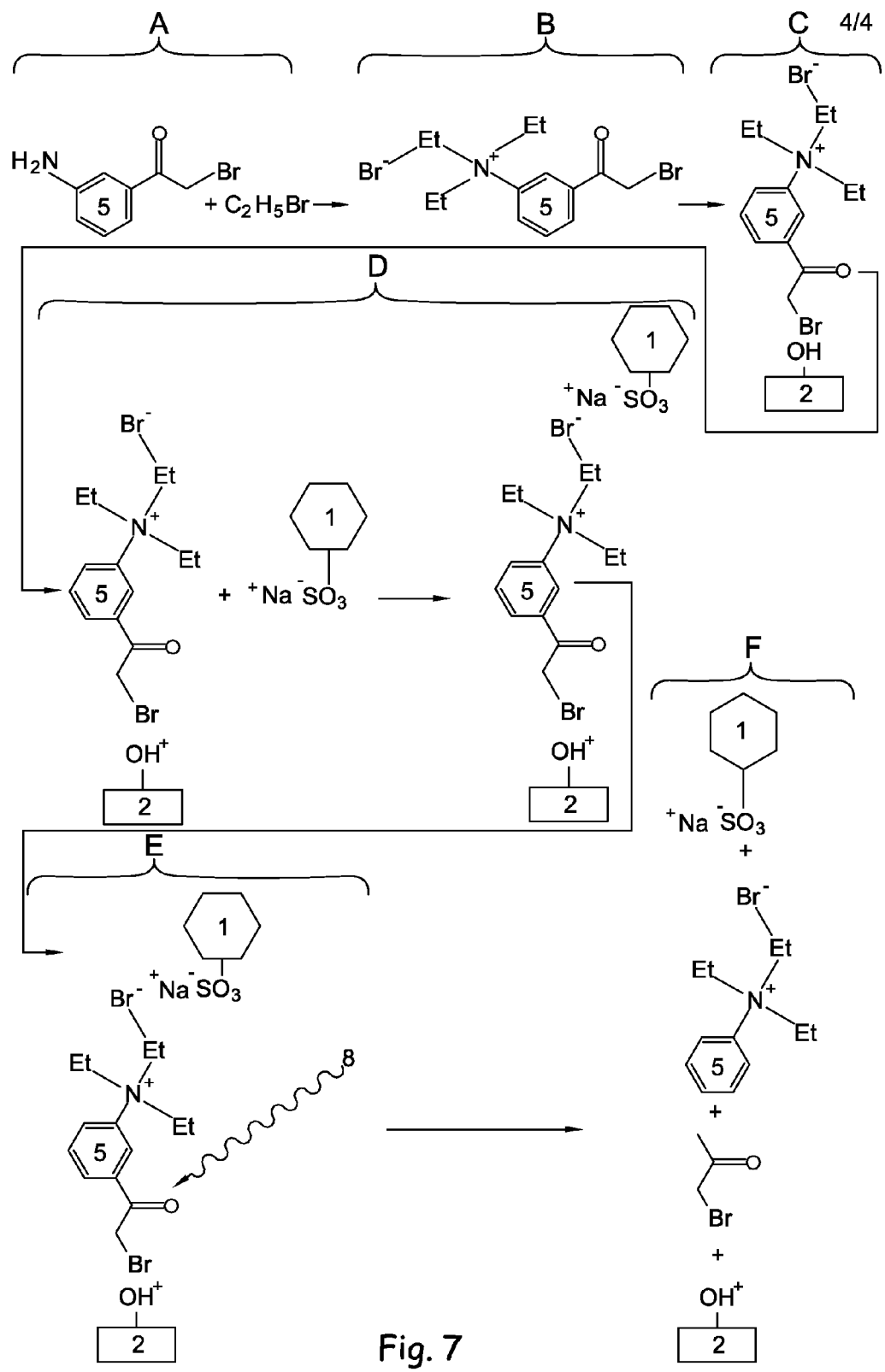

As illustrated in FIG. 7, the same process such as described in example 1 is done with the photolabile compound (5) being carboxymethyl 3-aminophenyl ketone.

What is claimed is:

1. A process for removing an ink composition from a printed media substrate, comprising the steps of:
    providing a media substrate including an ink printed image wherein the ink composition or the media substrate contains photolabile entities, wherein the photolabile entities are compounds including groups selected from ortho-nitrobenzyl groups, phenacyl groups, benzoic ester groups, ortho-nitrophenyl glycol groups, dithiane groups, sulphonamide groups, benzyl alcohol groups, polycyclic aromatic hydrocarbon groups, and combinations thereof; and
    applying UV light on said printed substrate wherein the emitted UV light has a wavelength value which is below a threshold wavelength of said photolabile entities, thereby breaking or disintegrating the photolabile entities and rupturing chemical bonds that link the ink composition to the media substrate.

2. The process according to claim 1 wherein the groups are incorporated into a polymeric chain selected from polyethylene polymers, poly(methyl methacrylate) polymers, and combinations thereof.

3. The process according to claim 1 wherein the photolabile entities are linked to pigments present in the ink composition.

4. The process according to claim 1 wherein the photolabile entities are linked to a polymer shell encapsulating pigment present in the ink composition.

5. The process according to claim 1 wherein the photolabile entities are present in a coating layer of the media substrate.

6. The process according to claim 1 wherein the media substrate is a paper substrate.

7. The process according to claim 1 wherein the UV light wavelength value is below 300 nm.

8. The process according to claim 1 wherein said process further comprises the step of removing the ink composition using a mechanical device.

9. The process according to claim 1 wherein said process further comprises the step of removing ink residue, from a resulting blank substrate, with a vacuum.

10. The process according to claim 9 wherein said process further comprises the step of recycling the ink residue.

11. The process according to claim 9 wherein said process further comprises the step of reusing the blank substrate in a subsequent printing process.

12. The process according to claim 1 wherein the photolabile entities are selected from 6-nitroveratroyloxy carbonyl; nitrobenzyloxy carbonyl; di(nitrobenzyl)oxycarbonyl); 3-nitrophenylpropyl-oxycarbonyl; 5'-(α-methyl-2-nitropiperonyl)oxycarbonyl; 2-(3,4-methylenedioxy-6-nitrophenyl)propoxycarbonyl; a methylphenacyl; 3-methoxyphenacyl; 3-hydroxyphenacyl; 3-aminophenacyl; 3,5-dimethoxy benzoid; o-nitrophenylethylene glycol; Bis(o-nitrophenyl) ethanediol; 1,3-dithiane; 2-phenyl-1,3-dithiane; benzyloxycarbonyl; M-dimethoxy benzyl alcohol; α,α-dimethyl-3,5-dimethoxybenzyloxycarbonyl; 9-phenylxanthen-9-yl; 2-aryl-4-quinoline; anthraquiono-2-yl-methoxy-carbonyl; pyren-1-ylmethoxycarbonyl; and phenathren-9-yl-methoxycarbonyl.

13. A process for removing an ink composition from a printed media substrate, comprising the steps of:
    providing a media substrate including an ink printed image wherein the ink composition or the media substrate contains photolabile entities; and
    applying UV light on said printed substrate wherein the emitted UV light has a wavelength value which is below a threshold wavelength of said photolabile entities;
    wherein the photolabile entities are compounds comprising phenacyl groups or benzoic ester groups.

14. An ink composition containing polymer-encapsulated pigments comprising a pigment core and a polymer shell wherein said polymer shell includes photolabile entities, wherein the photolabile entities are compounds including groups selected from ortho-nitrobenzyl groups, phenacyl groups, benzoic ester groups, ortho-nitrophenyl glycol groups, dithiane groups, sulphonamide groups, benzyl alcohol groups, polycyclic aromatic hydrocarbon groups, and combinations thereof.

15. The ink composition according to claim 14 wherein the photolabile entities are compounds including phenacyl groups or benzoic ester groups.

16. The ink composition as defined in claim 15 wherein the phenacyl groups are selected from α-methylphenacyl, 3-methoxyphenacyl, 3-hydroxyphenacyl, or 3-aminophenacyl.

* * * * *

UNITED STATES PATENT AND TRADEMARK OFFICE
CERTIFICATE OF CORRECTION

| | | |
|---|---|---|
| PATENT NO. | : 8,246,754 B2 | Page 1 of 1 |
| APPLICATION NO. | : 12/567365 | |
| DATED | : August 21, 2012 | |
| INVENTOR(S) | : Krzysztof Nauka et al. | |

It is certified that error appears in the above-identified patent and that said Letters Patent is hereby corrected as shown below:

In column 20, line 18, in Claim 12, delete "a" and insert -- α --, therefor.

In column 20, line 24, in Claim 12, delete "anthraquiono" and insert -- anthraquinon --, therefor.

In column 20, line 25, in Claim 12, delete "phenathren" and insert -- phenanthren --, therefor.

Signed and Sealed this
Twelfth Day of February, 2013

Teresa Stanek Rea
*Acting Director of the United States Patent and Trademark Office*